United States Patent [19]

Faroudja et al.

[11] Patent Number: 4,916,526
[45] Date of Patent: Apr. 10, 1990

[54] BANDWIDTH CONTROL FOR CHROMINANCE AND LUMINANCE PATHS IN QUADRATURE MODULATED COLOR TELEVISION SYSTEM

[75] Inventors: Yves C. Faroudja, 26595 Anacapa Dr., Los Altos, Calif. 94022; Jack J. Campbell, San Francisco, Calif.

[73] Assignee: Yves C. Faroudja, Los Altos, Calif.

[21] Appl. No.: 188,085

[22] Filed: Apr. 27, 1988

Related U.S. Application Data

[63] Continuation of Ser. No. 825,051, Jan. 31, 1986, abandoned.

[51] Int. Cl.$^4$ .............................................. H04N 9/78
[52] U.S. Cl. ...................................................... 358/31
[58] Field of Search ........................................... 358/31

[56] References Cited

U.S. PATENT DOCUMENTS

| | | | |
|---|---|---|---|
| 4,050,084 | 9/1977 | Rossi | 358/31 |
| 4,223,340 | 9/1980 | Bingham | 358/37 |
| 4,389,665 | 6/1983 | Nagao et al. | 358/31 |
| 4,417,270 | 11/1983 | Nagao et al. | 358/36 |
| 4,422,094 | 12/1983 | Lewis | 358/37 |
| 4,504,853 | 3/1985 | Faroudja | 358/37 |
| 4,623,924 | 11/1986 | Wargo | 358/37 |
| 4,626,894 | 12/1986 | Harwood et al. | 358/31 |
| 4,651,196 | 3/1987 | Harwood et al. | 358/31 |
| 4,686,561 | 8/1987 | Harwood et al. | 358/31 |

FOREIGN PATENT DOCUMENTS

| | | | |
|---|---|---|---|
| 57789 | 4/1985 | Japan | 358/31 |
| 249493 | 12/1985 | Japan | 358/31 |

OTHER PUBLICATIONS

Maxemchuk et al., Separation of NTSC Signals by Minimum Mean Square Error Filters and Adaptive Filters, IEEE Transactions on Communications, vol. COM 26, No. 5, May 1978, pp. 583-593.

Primary Examiner—John W. Shepperd
Attorney, Agent, or Firm—David B. Harrison

[57] ABSTRACT

A method is disclosed for reducing bandwidth of a chrominance path to reduce cross-color artifacts in a quadrature modulated color television signal. The method includes the steps of detecting the level of a chrominance component of the signal; developing a control signal from the detected chrominance component level; and, controlling the bandwidth of the chrominance path in accordance with the control signal so as to reduce bandwidth only when chrominance component is at a level below a predetermined threshold. The method for developing a control signal may further include the step of eliminating the sign thereof followed by a step for establishing a predetermined minimum threshold value of the absolute value chrominance level below which the control signal is not generated.

4 Claims, 4 Drawing Sheets

BANDWIDTH CONTROL FOR CHROMINANCE AND LUMINANCE PATHS IN QUADRATURE MODULATED COLOR TELEVISION SYSTEM

This application is a continuation of application Ser. No. 06/825,051 filed 1/31/86, now abandoned.

BACKGROUND OF THE INVENTION

The present invention relates to the signal processing of a quadrature modulated subcarrier color television signal. More particularly, the present invention relates to the control of bandwidths of the chrominance and luminance paths in a quadrature modulated color television chroma/luminance separator in order to improve the performance thereof.

U.S. Pat. No. 4,504,853 is related to the present invention in the sense of increasing apparent bandwidth of chrominance, although by quite different methods and for different reasons.

A composite video signal contains both luminance and chrominance information. Decoding and many other processes require the separation of the luminance and chrominance signals from the composite signal. All methods of chrominance separation use a bandpass or high pass filter somewhere in the chrominance signal processing structure, and all methods of luminance separation use a notch or low pass filter somewhere in the lumnance signal processing structure.

Because of the spectral overlap of the luminance and chrominance information it is impossible completely to separate the two signals. The incomplete separation of these two signals results in luminance component contamination in the chrominance signal component, and this is called "cross-color". The concomitant chrominance component contamination present in the luminance signal component is known as "cross-luminance". Cross-color is seen in the picture display as a rainbow artifact which occurs at certain luminance transitions, and cross-luminance is seen as dot crawl and occurs at certain chrominance transitions.

The width of the bandpass filter in a chrominance separator determines the chrominance resolution/cross-color tradeoff; and the width of the notch filter in a luminance separator determines the luminance resolution/cross-luminance tradeoff. As the width of the bandpass filter in the chrominance separator increases, chroma resolution increases and cross-color contamination increases. As the width of the notch filter in the luminance separator decreases, luminance resolution increases and cross-luminance contamination in the chroma component likewise increases.

Wide chroma bandwith is very desirable under certain picture conditions. For example, in the instance of a horizontal domain transition between a green bar and a magenta bar of a color bar test pattern (maximum color phase shift), the chroma transition between the green bar and the magenta bar should be as sharp as possible, and such high resolution requires a wide chroma bandwidth. Narrow chroma bandwidth is desirable under certain other picture conditions. Cross-color pollution can be reduced when chroma sharpness is not as important. At low chroma amplitude levels or at low chroma transition levels, the present inventors have discovered that the sharpness of chroma transitions are less important to overall picture quality, and that the bandwidth of the chroma path may be made quite narrow in order to reduce cross-color pollution in the picture.

Wide luminance bandwidth (narrow notch) is very desirable under most picture conditions. Maximum resolution or picture sharpness is almost always desirable. However, the visibility of cross-luminance is greatly increased if the luminance notch bandwidth is decreased. The narrower the luminance notch bandwidth, the much more likely will be the production of unwanted cross-luminance artifacts in the reproduced picture images. The present inventors have observed that frequently cross-luminance (dot-crawl) is very objectionable, even to the point of hinding a luminance transition. At these times a narrower luminance bandwidth (wider notch) is desirable to reduce the cross-luminance even in some instances at the expense of luminance sharpness. The present inventors have also observed that luminance sharpness is less important when the luminance is superimposed with a high chroma level in the composite signal.

Narrow chroma bandwidth is much less susceptible to generation of cross-color artifacts. At low chroma levels and at low chroma transition levels, the present inventors have discovered that the bandwidth of the chroma path may be made quite narrow in order to reduce cross-color pollution of the picture with little degradation otherwise upon chroma performance in the reproduced picture image.

Television receiving sets of the consumer variety are typified by narrow chroma path bandwidth, and such sets are not very sensitive to cross-color problems. However, in the case of large screen television color projectors, the situation is different. These projectors typically employ wide chroma bandwidths and have significant problems with cross-color artifacts visible in the reproduced and projected picture images.

Comb filters implemented by recursive processing of successive scan lines developed by line scan delay lines are increasingly found in color television decoders which decode quadrature modulated color television signals in which a chrominance component is interleaved between energies of a luminance component in the vicinity of a chroma subcarrier, typically 3.58 MHz in the NTSC format. The primary purpose of a comb filter decoder is to separate the chroma component and the luminance component from the composite color signal. Each component should have as full a bandwidth as possible, and the luminance component should have as few chroma artifacts as possible.

One of the most significant artifacts in the luminance component are rows of horizontal dots. These dots are typically present whenever the chroma component changes in the vertical direction, and they are taken care of by processing in the vertical domain, as is taught for example by U.S. Pat. Nos. 4,179,705 and 4,240,105.

In the process of decoding the luminance component with comb filter techniques, luminance combing is commonly limited to high frequencies located in the vicinity of the chroma subcarrier. Therefore, some chroma sideband energy at low frequencies (2–MHz) may not necessarily be perfectly eliminated in the luminance path; and, as a result, columns of vertical dots in the picture for horizontal rate transitions (which appear as vertical lines in the picture) will appear whenever there is a change in the chroma at the horizontal rate.

Thus, a hitherto unsolved need has arisen to eliminate cross-luminance, artifacts, such as the vertical dots in the luminance path which accompany horizontal domain chroma transistors, and to eliminate cross-color artifacts, such as the rainbow pattern which appars at the instance of horizontal domain luminance transistions.

SUMMARY OF THE INVENTION WITH OBJECTS

A general object of the present invention is to optimize the inherent chrominance resolution/cross-color tradeoff which occurrs during a chroma separation process in a quadrature modulated color subacarrier television system.

A concomitant general object of the present invention is to optimize the inherent luminance resolution/cross-luminance tradeoff which occurs in a luminance separation process in a quadrature modulated color subcarrier television system.

A specific object of the present invention is to control the bandwidth of the chrominance path in a quadrature modulated color television decoder so that the path is as wide as possible under certain signal conditions and so that the path is as narrow as possible and still functional under other signal conditions present in the path.

Another specific object of the present invention is to control the bandwidth of the luminance path in a quadrature modulated color television decoder so that the bandwidth is high under certain signal conditions and so that the bandwidth is low, thus minimizing cross-luminance, under certain other signal conditions.

In accordance with the present invention, a method for reducing bandwidth of a chrominance path to reduce cross-color artifacts in a quadrature modulated color television signal includes the steps of:
  detecting at least one of chrominance level, chrominance transition level and luminance transition level in the signal, present in the path,
  developing a control signal from one or both of the detected levels and
  controlling the bandwidth of the chrominance path in accordance with the control signal so as to reduce bandwidth only when the levels are below a predetermined threshold.

In one aspect of the present invention, the steps of detecting the level of the chrominance transition, detecting the level of the chrominance itself and developing a control signal include the steps of eliminating the sign of the chrominance transition and eliminating the sign of the chrominance level, followed by steps for establishing a predetermined minimum threshold value of the absolute value chrominance transition and for establishing a predetermined minimum threshold value of the absolute value chrominance level below which the control signal is not generated.

In another aspect of the present invention, the control signal is a proportional value and the step of controlling the bandwidth of the chrominance path comprises the steps of dividing the chrominance component in the path into a narrow bandwidth portion and a wide bandwith portion, developing a difference signal between the wide bandwidth portion and the narrow bandwidth portion and combining the difference signal with the narrow bandwidth portion in an amount related to the amplitude of the control signal.

These and other objects, advantages and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
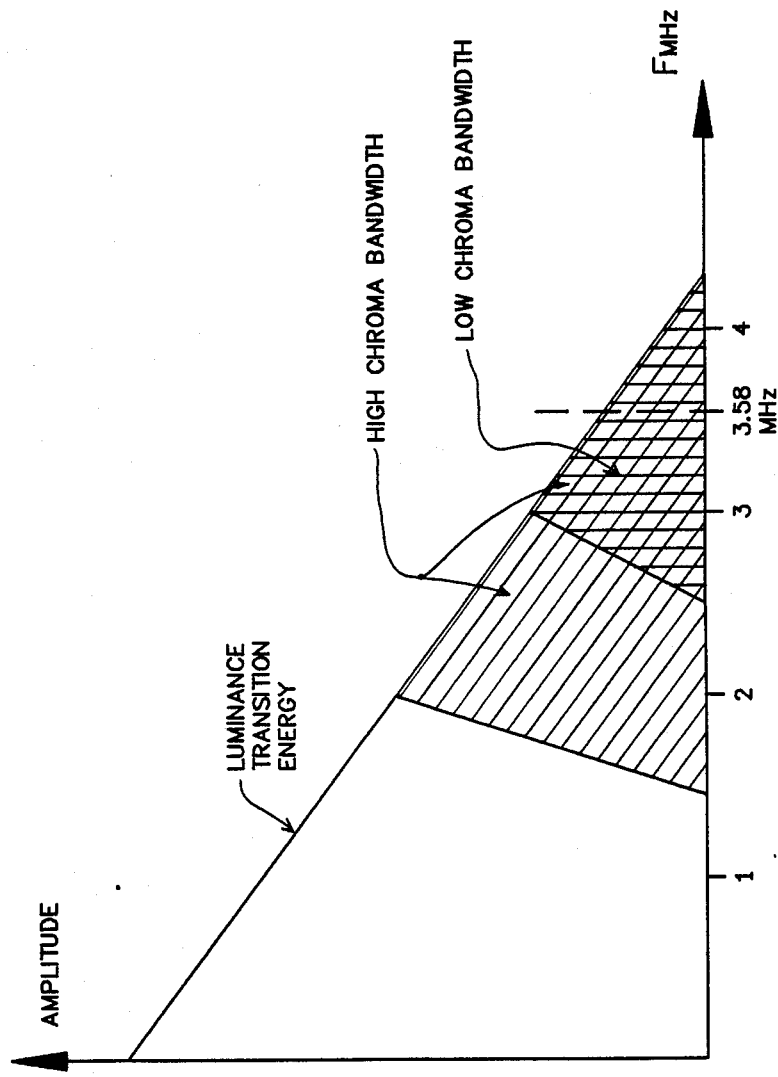
FIG. 1 is a spectral plot of a luminance transition showing the chroma subcarrier energy as an overlay thereon.

The FIG. 1 spectral plot of energy a luminance transition in a quadrature modulated color television signal demonstrates that most of the spectral energy lies toward the low end of the spectrum. As shown by this figure, if one limits the bandwidth of the chroma component to e.g. a narrow band between 3 and 4.2 MHz, the total cross-color energy will be a small amount. However, if the chroma bandwidth is widened to e.g. a wide band between 2.3 and 5 MHz, it is apparent from FIG. 1 that a much greater potential for cross-color energy overlap to occur is present in the 2.3 to 3 MHz portion of the spectrum. FIG. 1 shows that the potential for cross-color artifacts is related to a second order of the chroma path bandwidth. In FIG. 1, "area A" triangle graphs the chroma energy region of the color television signal spectrum capable of producing cross-color artifacts with a narrow chroma bandwidth, while "area B" triangle graphs a much larger chroma energy region in the same spectrum which is associated with a higher chroma bandwidth. The second order nature of cross-color pollution is immediately apparent by inspection of the relative areas (energies) of the A and B triangles. This fact is why most color decode paths have provided for narrow chroma bandwidth up to the present time.

Figure 2:
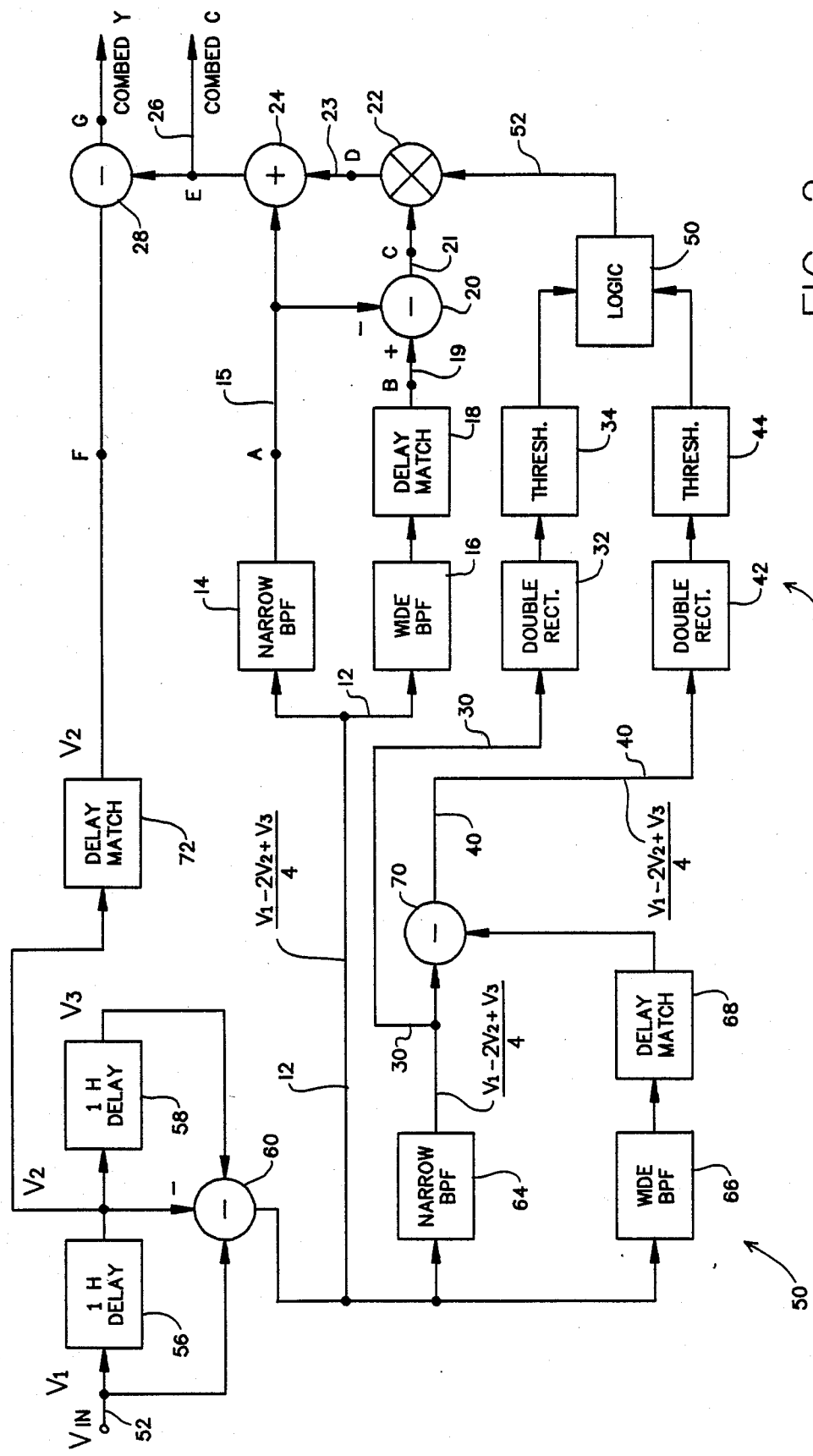
FIG. 2 is a block diagram of apparatus for controlling the bandwidth of a chrominance path in a quadrature modulated color television comb filter decoder in accordance with the principles of the present invention.

FIG. 2 illustrates a system 10 in which the bandwidth of a chroma path may be controlled in accordance with the principles of the present invention. Therein, an input 12 receives a combed chroma component, typically the function $\frac{1}{4}(V1-2V2+V3)$, where V is a scanning line, V1 being undelayed, V2 being delayed once, and V3 being twice delayed at the horizontal scan rate in accordance with conventional comb filtering techniques.

The input 12 is split into two paths, a narrow bandwidth path developed through a narrow bandwidth band pass filter 14, having 6DB points at e.g. 3 and 4.2 MHz; and, a wide bandwidth path developed through a wide bandwidth band pass filter 16, having 6DB points at e.g. 2 and 5 MHz. Since the transit time through the width filter 16 is faster than through the narrow filter 14, a delay matching circuit 18 matches wide bandwidth transit time with the narrow bandwidth transit time.

A subtractor circuit 20 subtracts the wide bandwith component on a line 19 from the filter 16 and delay 18 from the narrow bandwidth component from the filter 14 present on a line 15. A spectral difference signal is generated by the subtractor 20 and is put out on a line 21.

The difference signal on the line 21 enters a processing circuit 22 which may be a non-linear combiner or a multiplier. The processing circuit 22 is controlled by a bandwidth control signal BWc on a line 52 to be described in greater detail shortly. The processing circuit 22 puts out the difference signal on a line 23 in direct relation to the control signal BWc.

The narrow bandwidth component on the line 15 and the difference signal on the line 23 are combined in an adder circuit 24 and provide a chroma component at an output 26 in which the bandwidth is directly related to the amount of the difference signal put out by the circuit 22. For example, when chroma level is high, the transfer function of the circuit 22 will be unity, and a full chroma bandwidth will be present at the output 26. When chroma level is low, but is greater than a minimum threshold value, the transfer function of the circuit 22 will be less than unity, and the bandwidth of the chroma component at the output 26 will be narrowed accordingly.

A chroma level signal is provided to a control input 30. This signal may be any signal bearing a relationship to chroma amplitude. One acceptable signal is bandpass filtered composite video energy lying in the vicinity of the chroma passband. This spectral region is principally chroma energy aand may also include some high frequency luminance energy groups. This chroma level signal is is full wave rectified by a rectifier 32 in order to remove the sign or direction of the level signal. A minimum threshold, typically 5 IRE units, is established by action of a threshold circuit 34. If the absolute value chroma level signal is below the threshold, the circuit 34 puts out no value. If the chroma level signal is above the threshold, the circuit 34 puts out the absolute value of the signal.

In like manner, a chroma transition level signal is provided to a control input 40. This signal may be any signal bearing a relationship to chroma transitions. Since it is apparent that chroma transitions occupy a greater bandwidth than steady state chroma, one source of the chroma transition signal presented at the input 40 may be band passed/band rejected horizontal domain transitions in a spectrum which includes chrominance sidebands indicative of the chroma transition but which does not include chroma components lying in the immediate vicinity of the chroma subcarrier. The signal at the input 40 is full wave rectified by a rectifier 42 in order to remove the sign or direction of the transition. A minimum threshold, typically 5 IRE units, is established by action of a threshold circuit 44 which operates in the same manner as was described for the circuit 34.

The two processed control signals from the threshold circuits 34, 44 enter a logic circuit 50 which develops the control signal BWc and puts it out on a line 52 to control operation of the processing circuit 22.

The logic circuit 50 operates as follows:

If a high chroma level or a high chroma transition level is present, the chroma control signal BWc will cause the circuit 22 to provide a wide bandwidth chroma path related to the greater magnitude of chroma level or chroma transition.

If a low chroma level and a low chroma transition level is present, the chroma control signal BWc will not be put out, and the narrowest useful chroma bandwidth will obtain, since it is only the component present on the line 15 from the narrow band pass filter 14 which is present at the output 26.

While the control signal BWc has been described as being a function of both chroma level and chroma transition level, only one of these levels need be used in practice with satisfactory results. Chroma level is typically easier to develop than chroma transition level, and chroma level alone will work satisfactorily in the circuit 10. Both signals will provide enhanced performance under some chroma path conditions, at slightly greater circuit complexity and expense.

FIG. 2 also includes a typical signal processing structure 50 embodying well known principles. The structure 50 is typically found in the video path upstream of the system 10 and may be employed to provide the input signals delivered to the system 10 on the lines 12, 30 and 40 shown in FIG. 2. Other signal processing structures well known to those skilled in the art may be adopted and used in place of the structure 50.

The structure 50 includes an input 52 for receiving a composite quadrature modulated color subcarrier television signal V1. A comb filter structure 54 is connected to the input 52. The structure includes two single scan line delays 56 and 58 connected in tandem to provide a one scan period delay version of the input signal, V2, and a two scan period delay version of the input signal, V3. A subtractor circuit 60 receives the V1, V2 and V3 signal components and puts out the function $$\frac{V1 - 2V2 + V3}{4}$$

on the line 12.

A narrow bandpass filter 64 connected to the line 12 bandpass filters the combed chroma function thereon in the vicinity of the chroma subcarrier in order to yield the signal which is representative of chroma level and which is presented on the line 30. A wide bandpass filter 66 is also connected to the receive the combed chroma function on the line 12. the filter 66 is also centered about the chroma subcarrier but is designed to pass a wider spectral bandwidth which includes quadrature modulated sideband energies present during a chroma transition. A delay match 68 delay matches the output of the wide bandpass filter 66 with the chroma level control signal on the line 30. The narrow bandwidth chroma representation on the line 30 is then subtracted from the delay matched, wide bandwidth output of the filter 66 in a subtractor circuit, to yield a chroma transition representation which is essentially a wide chroma passband with the narrow bandwidth thereof removed. This arrangement is one known way to develop a chroma transition control signal, and this function, being the combed chroma signal emphasizing chroma transition energy is presented as the control on the line 40.

Figure 3A:
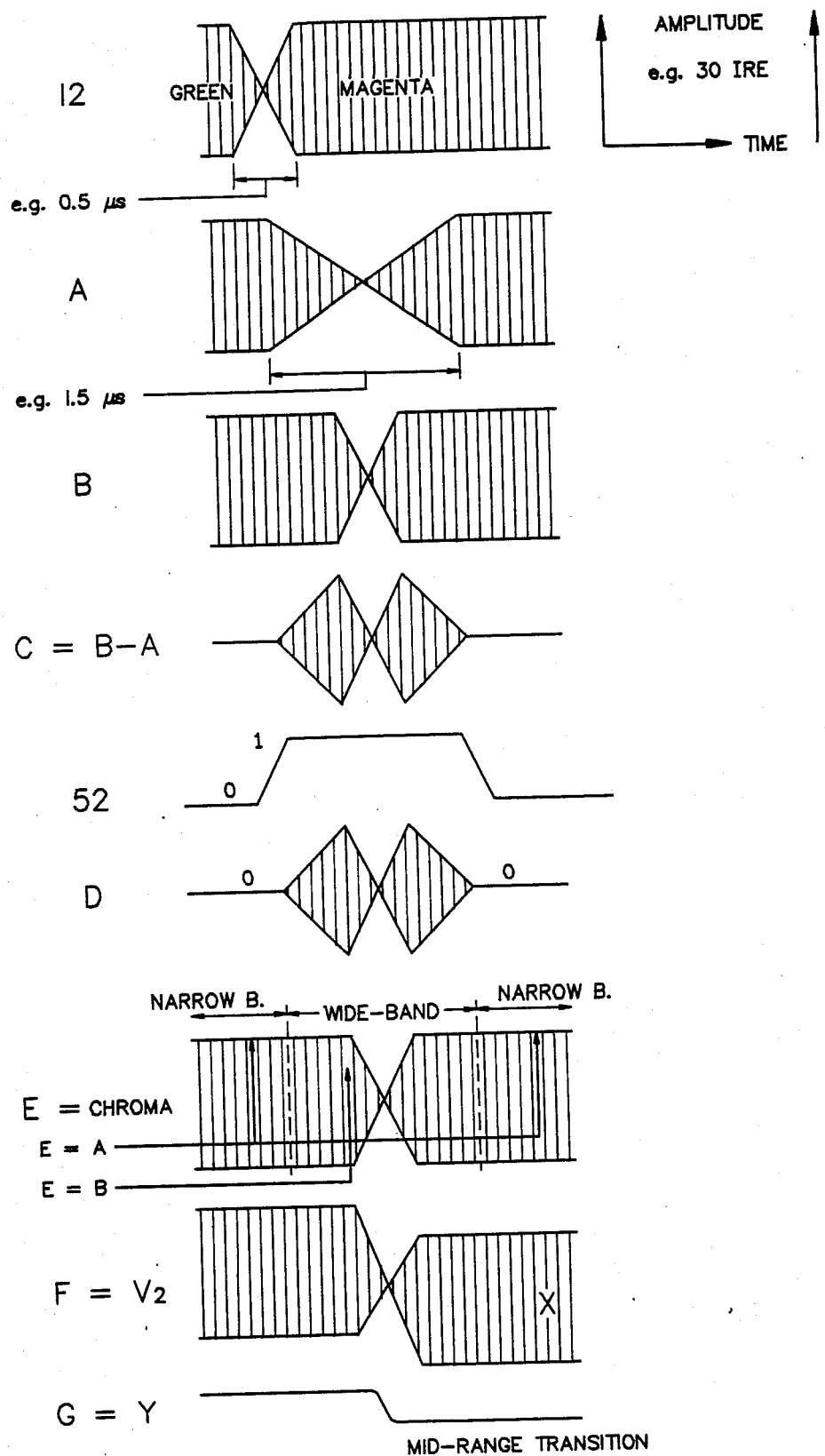
FIG. 3A is a series of graphs of amplitude/time domain waveforms illustrating operation of the FIG. 2 circuitry in respone to an exemplary mid-range chroma transition.
Figure 3B:
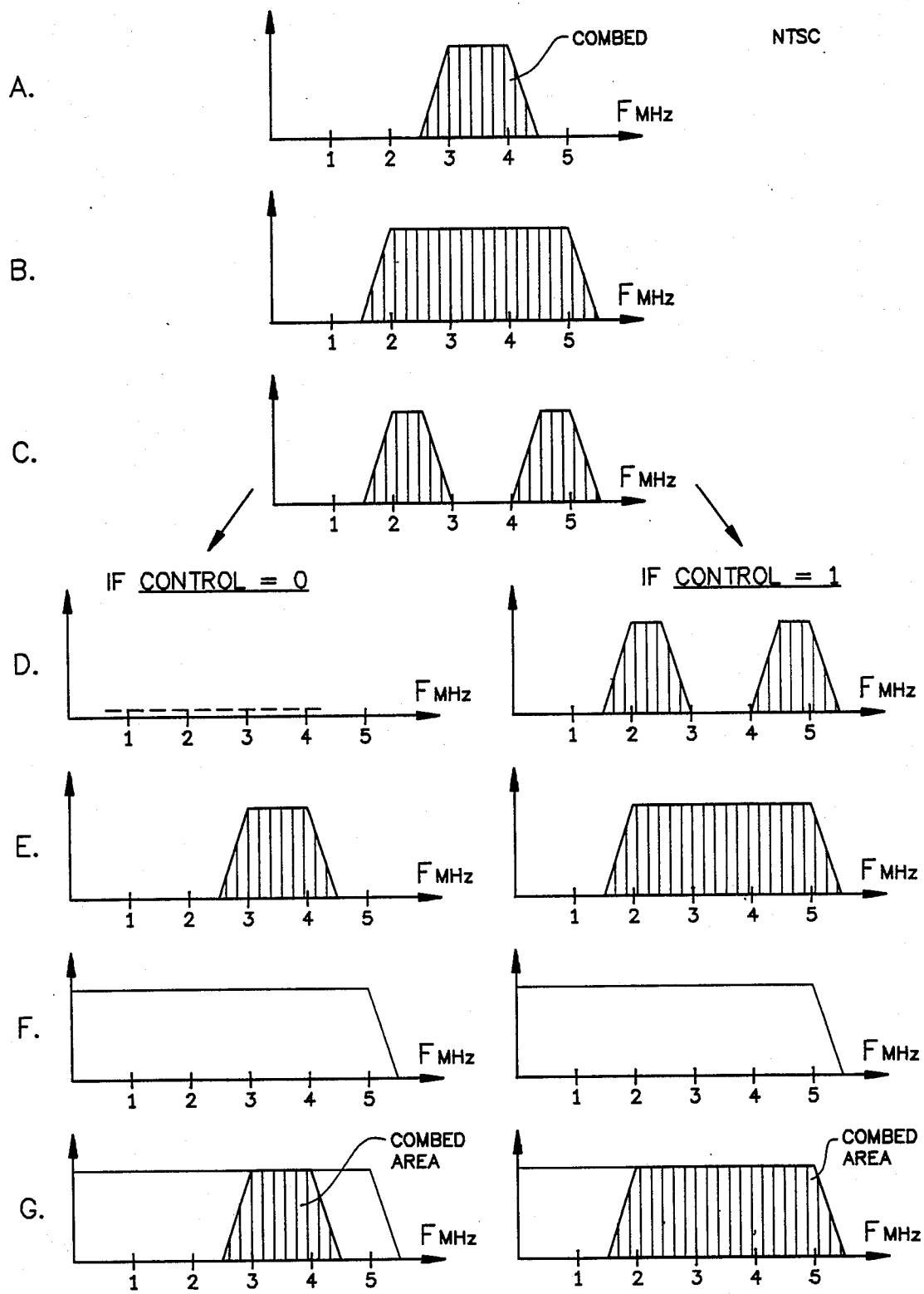
FIG. 3B is a series of graphs of amplitude/spectrum waveforms also illustrating operation of the FIG. 2 circuitry in response to the chroma transition depicted by the FIG. 3A graphs.

Further understanding and appreciation of the operation of the system 10 depicted in FIG. 2 may be obtained by reference to FIGS. 3A and 3B. Referring first to the time domain graphs presented in FIG. 3A, for example a 30 IRE unit amplitude green to magenta chroma transition is depicted as the combed chroma function appearing at the line 12 of the system 10. This transition of maximum color phase shift typically occurs over a 500 nanosecond interval.

Waveform A depicts the same transition after it has passed through the narrow bandpass filter 14. As is well understood, the transition is widened by the filtering process and now occurs over approximately a 1500 nanosecond interval.

Waveform B depicts wide bandpass filtering of the combed chroma input function on the line 12. The waveform B has been delay matched so that the sharp 500 ns transition is aligned in time with the wider 1500 nanosecond transition put out by the filter 14. The subtractor circuit subtracts the A waveform from the B waveform to produce waveform C.

The logic circuit 50 generates a logic level BWc on the line 52, such as unity during the time interval of the waveform C energy; and, the waveform C energy is multiplied by this e.g. unity logic level in the multiplier 22 and put out as waveform D. When the logic level is zero, no chroma energy appears at the output of the multiplier 22.

Before and after the BWc logic signal interval on the line 52, the system 10 puts out narrow bandpass filtered chroma as passed by the filter 14 and the adder 24. However, during the BWc logic level interval when the logic level is other than zero, the waveform D function is added to the waveform A function by the adder circuit 24, resulting in a sharper (wider bandwidth) chroma transition as exemplified by waveform F which is also the composite signal V2. In the example shown in FIG. 3A for waveform F, a luminance transition also accompanies the chroma transition, as is often the case in practice.

When the waveform E signal is subtracted from the waveform F signal by the subtractor 28, a very clean luminance transition free of chroma artifact pollution is produced at the combed luminance output of the subtractor circuit 28.

Referring now to the spectral graphs presented in FIG. 3B, the narrow bandwidth combed chroma signal put out by the filter 14 is graphed as waveform As. Waveform Bs shows the output of the wide bandpass filter circuit 16. The subtraction process carried out the subtractor 20 results in the waveform Cs graph which shows chroma sidebands but not the central chroma passband region which has been subtractively removed.

When the logic level BWc on the line 52 is zero, the left graphs for waveforms Ds, Es, Fs and Gs obtain and illustrate narrow bandwidth chrominance/luminance separation processing carried out by the system 10. When the logic level BWc on the line 52 is unity, for example, the right graphs illustrate wide bandwidth chrominance/luminance separation processing carried out by the system 10.

Normally, the combed chroma on the line 26, whose bandwidth has been optimized as previously described, may be subtracted from properly timed, phase and amplitude matched composite video V2 in a subtractor 28, thereby delivering a combed luminance output Y. However, it will be apparent to those skilled in the art that combed luminance may be obtained by different means than as described in connection with FIG. 1 without departure from the spirit and scope of the present invention. For example, a system such as the system 10 of FIG. 1 might be used only for luminance optimization, and a second system used for chroma optimization, such as the system 10 but employing values and parameters which have been optimized for chroma. Another example is direct averaging of the bandpass filtered high frequencies of adjacent lines of the video signal, in order to obtain combed luminance; the cutoff frequencies of the bandpass filtering being varied in accordance with the principles of the present invention.

While bandwidth control has been described as being based upon detection of chroma level or chroma transition level information, it is to be understood that a satisfactory control signal may be derived from detection of luminance transition level.

To those skilled in the art to which this invention pertains, many widely varying embodiments and modifications will be suggested without departure from the principles of the present invention, the scope of which is more particularly defined by the following claims.

We claim:

1. A method for reducing bandwidth of a chrominance path to reduce cross-color artifacts in a quadrature modulated color television signal including the steps of:

detecting the level of chrominance transitions of a chrominance component of the signal, detecting the level of the chrominance component itself, developing a control signal from the detected chrominance transition level and the detected chrominance level, controlling the bandwidth of the chrominance path in accordance with the control signal so as to reduce bandwidth only when chrominance transition level and chrominance level are at values below predetermined thresholds.

2. The method set forth in claim 1 wherein the steps of detecting the level of the chrominance transition, detecting the level of the chrominance itself and developing a control signal include the steps of eliminating the sign of the chrominance transition and eliminating the sign of the chrominance level, followed by steps for establishing a predetermined minimum threshold value of the absolute value chrominance transition and for establishing a predetermined minimum threshold value of the absolute value chrominance level below which the control signal is not generated.

3. The method set forth in claim 2 wherein the predetermined minimum threshold values are approximately 5 IRE units.

4. The method set forth in claim 1 wherein the control signal is a proportional value and wherein the step of controlling the bandwidth of the chrominance path comprises the steps of dividing the chrominance component into a narrow bandwidth portion, developing a difference signal between a wide bandwidth portion and the narrow bandwidth portion and combining the difference signal with the narrow bandwidth portion in an amount related to the amplitude of the control signal.

* * * * *